(12) United States Patent
Spence et al.

(10) Patent No.: US 6,487,581 B1
(45) Date of Patent: Nov. 26, 2002

(54) APPARATUS AND METHOD FOR A MULTI-CLIENT EVENT SERVER

(75) Inventors: Kurt E. Spence; Peter Houck, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/317,757

(22) Filed: May 24, 1999

(51) Int. Cl.[7] .............................................. G06F 15/16
(52) U.S. Cl. ...................... 709/203; 709/219; 709/223; 709/217
(58) Field of Search ................................ 709/227, 228, 709/229, 219, 203, 223; 707/10

(56) References Cited

U.S. PATENT DOCUMENTS

| | | | | |
|---|---|---|---|---|
| 5,721,825 A | * | 2/1998 | Lawson et al. ............. | 709/203 |
| 5,881,269 A | * | 3/1999 | Dobbelstein ................ | 703/21 |
| 5,941,950 A | * | 8/1999 | Hwang et al. .............. | 709/227 |
| 6,029,201 A | * | 2/2000 | Neill .......................... | 709/228 |
| 6,105,067 A | * | 8/2000 | Batra ......................... | 709/227 |
| 6,154,782 A | * | 11/2000 | Kawaguchi et al. ........ | 709/239 |
| 6,185,600 B1 | * | 8/2001 | Spence ....................... | 709/203 |
| 6,304,893 B1 | * | 10/2001 | Gish .......................... | 709/203 |
| 6,330,557 B1 | * | 12/2001 | Chauhan ...................... | 707/3 |

* cited by examiner

Primary Examiner—Zarni Maung

(57) ABSTRACT

A method and apparatus for implementing a data server with interface socket connections for managing data for clients interfacing with a network, having program code for creating a data store, where the data store comprises data items generated from network systems in the network; program code for establishing a connection instance between each of the interface socket connections and each of a number of clients desiring access to the data store, where each connection instance corresponds to a different one of the clients; and program code for creating a connection instance object for each connection instance, where each connection instance object has attributes determined by its corresponding client, and each connection instance object provides its corresponding client with access to the data store.

25 Claims, 4 Drawing Sheets

APPARATUS AND METHOD FOR A MULTI-CLIENT EVENT SERVER

This application is related to the U.S. Application of Kurt Spence and John Yunker entitled "UNIVERSAL VIEWER/ BROWSER FOR NETWORK AND SYSTEM EVENTS USING A UNIVERSAL USER INTERFACE GENERATOR, A GENERIC PRODUCTION SPECIFICATION LANGUAGE, AND PRODUCT SPECIFIC INTERFACES", Ser. No. 08/986,601 filed Dec. 8, 1997 now U.S. Pat. No. 6,185,600, and incorporates by reference all that is disclosed therein.

FIELD OF THE INVENTION

This invention pertains to the field of networked computer systems, and more particularly to an apparatus and a method for managing event data for multiple clients in a network.

BACKGROUND OF THE INVENTION

The task of creating client/server architectures to promote the efficient processing of data is a constant challenge in the computer industry. As disclosed in the copending U.S. Application above, a universal event browser allows a client to access network event data generated by a corresponding network application, or network system. The architecture disclosed for each client access to the network is supported by a single event server for each client. Within that architecture, an event server (which in the application is referred to as a product specific interface) is initially populated with network event data and then maintains event data specifically related to a corresponding client. In that architecture, a one-to-one relationship between an event server and a client means that event changes made by a Client A are not reflected in other clients because the event server corresponding to Client A only comprises the single connection to Client A, and cannot broadcast changes to other clients.

In many instances, it may be beneficial for every client in the network to have access to the most updated event data at all times. While a given event server comprises event data for the entire network, only event data for a corresponding client, and not all network clients, is updated by the given event server. Its corresponding client, therefore, does not have access to updated event data from other clients. A need exists, therefore, for an apparatus and a method of managing event data for multiple clients such that every client has access to the most updated event data on the network.

SUMMARY OF THE INVENTION

This invention is, in general, directed to an apparatus and method for managing data for a plurality of clients interfacing with a network. Thus, the invention may comprise an apparatus for managing data for a plurality of clients interfacing with a network, comprising a number of computer readable media, and computer readable program code stored on the computer readable media, where the computer readable program code comprises code for implementing a data server comprising a number of interface socket connections, said code for implementing a data server comprising: program code for creating a data store, wherein the data store comprises data items generated from network systems in the network; program code for establishing a connection instance between each of said number of interface socket connections and each of the clients desiring access to the data store, and each connection instance corresponds to a different one of the clients; and program code for creating a connection instance object for each connection instance, wherein each connection instance object comprises attributes determined by its corresponding client, and each connection instance object provides its corresponding client with access to the data store.

The invention may also comprise an apparatus for managing event data for a plurality of clients interfacing with a network, comprising a number of computer readable media, and computer readable program code stored on said number of computer readable media, where the computer readable program code comprises code for implementing an event server comprising a number of interface socket connections, comprising: program code for creating an event store, wherein the event store comprises events generated from network systems in the network; program code for establishing a connection instance between each of said number of interface socket connections and each of the clients desiring access to the event store, wherein each connection instance corresponds to a different one of the clients; and program code for creating a connection instance object for each connection instance, wherein each connection instance object comprises attributes determined by its corresponding client, and each connection instance object provides its corresponding client with access to said event store.

The invention may also comprise an apparatus for managing event data for a plurality of clients interfacing with a network, comprising a number of computer readable media, where the computer readable program code comprises code for implementing an event server comprising a number of interface socket connections, comprising: program code for creating an event store, wherein the event store comprises events generated from network systems in the network; program code for establishing a connection instance between each of said number of interface socket connections and each of the clients desiring access to the event store, wherein each connection instance corresponds to a different one of the clients; program code for creating a connection instance object for each connection instance, wherein each connection instance object comprises attributes determined by its corresponding client, and each connection instance object provides its corresponding client with access to said event store; program code for detecting requests to perform a number of tasks from the connection instance objects, wherein a given one of the tasks corresponds to a given one of the connection instance objects; program code for creating a command list, wherein the command list comprises tasks; program code for adding a task to the command list; and program code for processing a task, comprising program code for removing a given one of the tasks from the command list and program code for creating a request thread, wherein a given connection instance object executes within said request thread, and the given connection instance object corresponds to said given one of the tasks.

The invention may also comprise a method for managing data for a plurality of clients interfacing with a network by implementing a data server comprising a number of interface socket connections, comprising: creating a data store, wherein the data store comprises data items generated from network systems in the network; establishing a connection instance between each of said number of interface socket connections and each of the clients desiring access to the data store, wherein each connection instance corresponds to a different one of the clients; and creating a connection instance object for each connection instance, wherein each connection instance object comprises attributes determined by its corresponding client, and each connection instance object provides its corresponding client with access to said data store.

This invention may also comprise a data server comprising a number of interface socket connections for an apparatus for managing data for a plurality of clients interfacing with a network, comprising means for creating a data store, where the data store comprises a number of data items generated from a number of network systems in the network, means for establishing a connection instance between each of said number of interface socket connections and each the clients desiring access to the data store, where each connection instance corresponds to a different one of the clients, and means for creating a connection instance object for each connection instance, where each connection instance object comprises attributes determined by its corresponding client, and each connection instance object provides its corresponding client with access to the data store.

BRIEF DESCRIPTION OF THE DRAWINGS

An illustrative and presently preferred embodiment of the invention is illustrated in the drawings in which.

DESCRIPTION OF PREFERRED EMBODIMENTS

Figure 1:
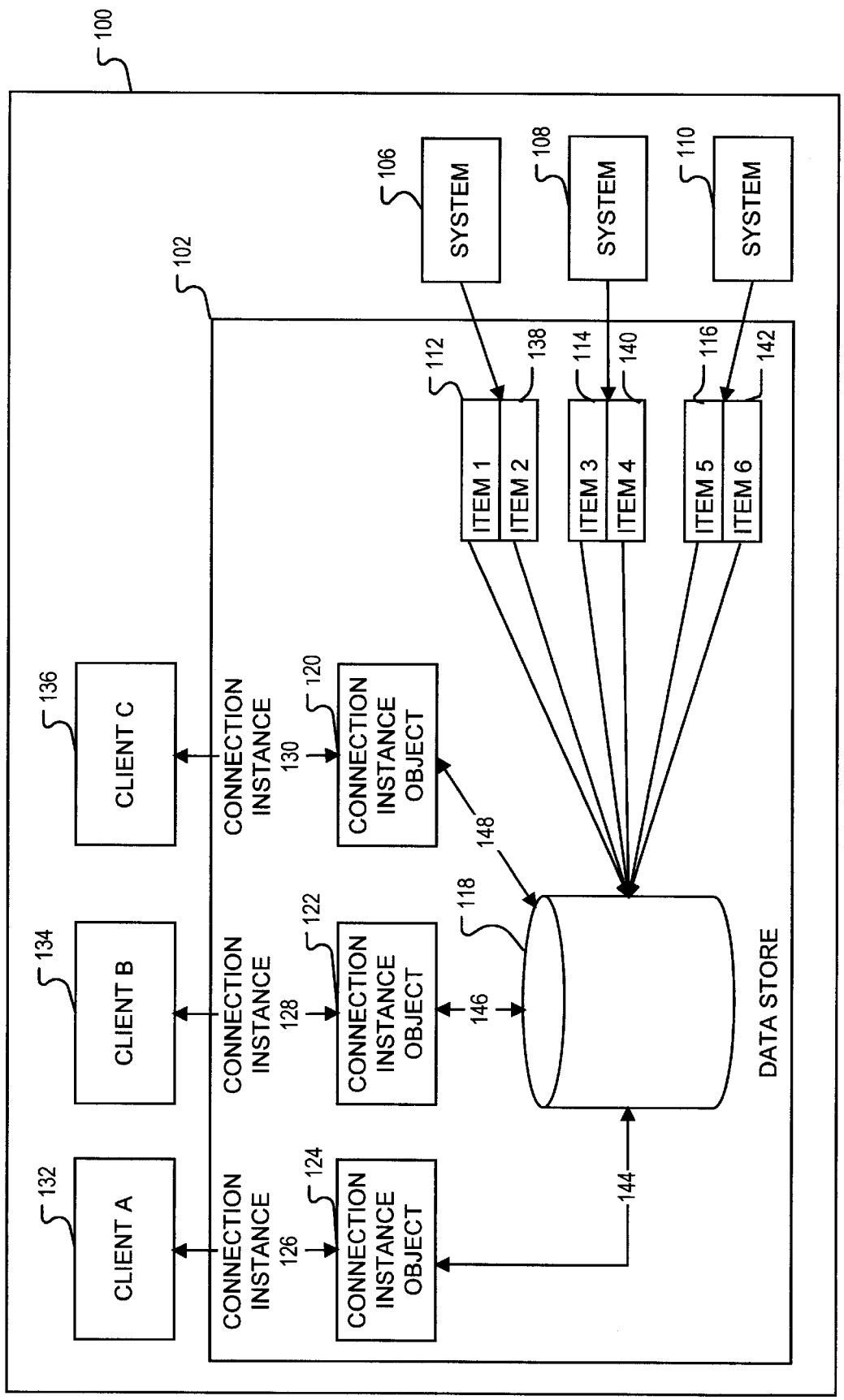
FIG. 1 illustrates an apparatus of the present invention.

FIG. 1, in general, illustrates an apparatus for managing data for a plurality of clients 132, 134, 136 interfacing with a network, comprising a number of computer readable media 100, and computer readable program code stored on the computer readable media, where the computer readable program code comprises code for implementing a data server 102 comprising a number of interface socket connections, comprising: program code for creating a data store 118, wherein the data store 118 comprises data items 112, 138, 114, 140, 116, 142 generated from network systems 106, 108, 110 in the network; program code for establishing a connection instance 126, 128, 130 between each of said number of interface socket connections and each of the clients 132, 134, 136 desiring access to the data store 118, and each connection instance 126, 128, 130 corresponds to a different one of the clients 132, 134, 136; and program code for creating a connection instance object 124, 122, 120 for each connection instance 126, 128, 130, wherein each connection instance object 124, 122, 120 comprises attributes determined by its corresponding client 132, 134, 136, and each connection instance object 124, 122, 120 provides its corresponding client 132, 134, 136 with access 144, 146, 148 to the data store 118. Computer readable media 100 depicted in FIG. 1 is not meant to limit the, number of computer readable media to one. The purpose of FIG. 1 is to illustrate that the present invention operates on and may include computer readable media, where the media is not limited to any specific number, nor any specific machine. In other words, it is conceivable that a data store 118 of the present invention can reside on a machine different from connection instance objects 124, 122, 120 of the present invention, and that the present invention comprises both machines, for example. Also, it is conceivable that the invention can reside on the same machine as a client to service that client and other clients, or that the invention can reside on one or more machines separate than all the clients. The point is that the invention should not be construed as being limited to any specific number of media, or being limited to operating on any specific media.

Figure 2:
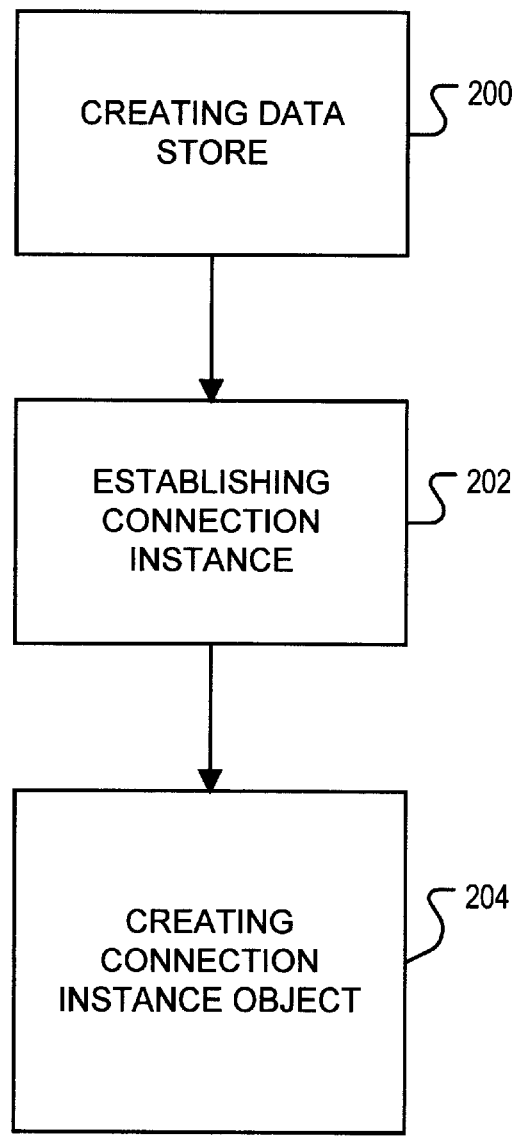
FIG. 2 illustrates a method of the present invention.

FIG. 2, in general, illustrates a method for managing data for a plurality of clients interfacing with a network, comprising implementing a data server comprising a number of interface socket connections, said implementing comprising: creating and accessing a data store 200, wherein the data store comprises data items generated from network systems in the network; establishing a connection instance 202 between the data server and each of the clients desiring access to the data store, wherein each connection instance corresponds to a different one of the clients; and creating a connection instance object 204 for each connection instance, wherein each connection instance object comprises attributes determined by its corresponding client, and each connection instance object provides its corresponding client with access to said data store.

Introduction

A multi-client event server of the present invention (hereinafter Event Server) captures data from a variety of network systems, and makes this network data dynamically available to any number of clients interfacing with the network. Unlike an event server of the invention disclosed in the related patent application above, the Event Server can handle more than one client, and thus has a different protocol for interacting with clients. In a preferred embodiment, the Event Server captures event data in a program such as Hewlett-Packard's Open View® Network Node Manager® product (hereinafter NNM, which is commercially available from Hewlett-Packard Co., 3404 East Harmony Road, Fort Collins, Colo. 80528). Programs such as NNM maintain and display information regarding network events and messages to aid network operators in understanding the ongoing health of a networked environment. The Event Server can interact with web clients, including a Java applet, and other types of clients including a universal viewer/browser of NNM described in the copending U.S. Application referred to above.

Figure 3:
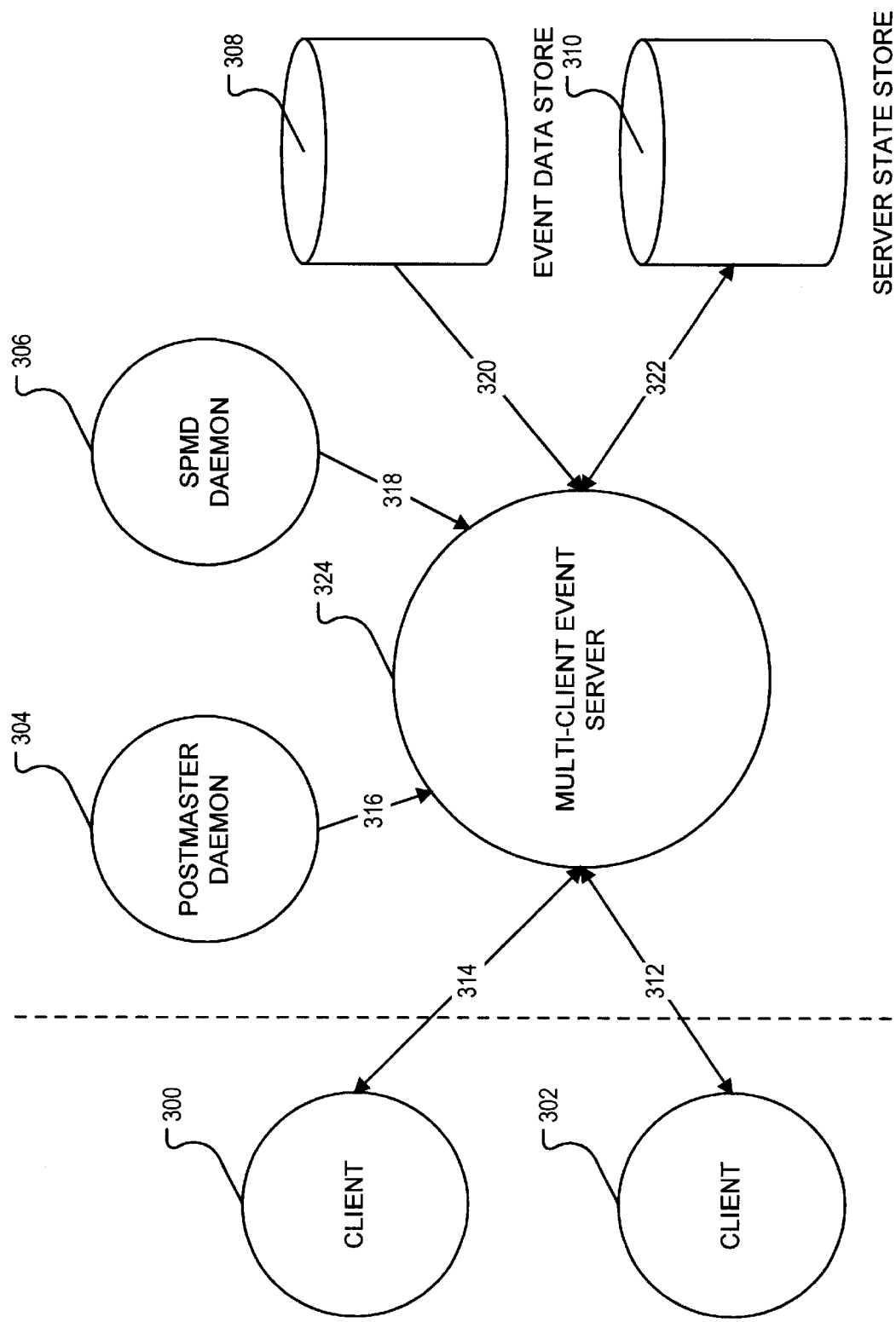
FIG. 3 illustrates a system architecture of the present invention in a preferred embodiment.

As shown in FIG. 3, the Event Server 324 in a network system interfaces with a number of clients 300, 302, a PostMaster daemon 304, a Startup Program Manager daemon (hereinafter SPMD daemon) 306, an Event Data Store 308, and a Server State Store 310.

Initializing the Event Server

The SPMD daemon 306 is a system application responsible for starting and stopping 318 all registered daemon applications, including the Event Server 324, and also communicates 318 daemon shutdowns to the Event Server 324. When the Event Server 324 first starts up, an Event Store (to be discussed) internal to the Event Server 324 is initialized 322 with data from the Server State Store 310. The Server State Store 310 is periodically updated by the Event Store, and thus comprises the last-saved current state of all events within the Event Store. The Event Store is then initialized 320 with data from the Event Data Store 308. The Event Data Store 308 comprises all event data known to the network system. Therefore, when the Event Store is initialized, the last-saved state of event data is restored 322 from the Server State Store 310 to the Event Store, and then event data that is added 320 to the Event Data Store 308 subsequent to the last save is added to the Event Store.

Maintaining the Event Store

The PostMaster daemon 304 is a system application responsible for collecting event data from network resources and applications. When the PostMaster daemon receives a new event, it does a number of things. The PostMaster daemon populates the Event Data Store with the new event so that the Event Data Store comprises all network events (not shown). The PostMaster daemon also populates 316 the Event Store with the new event so that the Event Store also comprises all network events which the Event Server can then update. The PostMaster daemon 304 also assigns a universal unique identifier (hereinafter UUID) to the new event, and passes 316 the UUID to the Event Store, which maintains a hash table using the UUID as a hash lookup key to event information (this will be discussed in more detail). The PostMaster daemon may also forward new events to other interested applications.

Accessing Event Data

Once the Event Server is initialized, any number of clients can connect 312, 314 to the Event Server to access and/or manipulate event data. In a preferable embodiment, clients are Java applets that display event data in a web-enabled browser. It is also within the scope of this invention, however, that other client applications can be created to interface with the Event Server.

A preferred embodiment of the Event Server comprises the following:

Processing Loop;
Socket Handler;
Thread Command Handler;
Connection Instance Object;
Event Store;
Client List;
Command List;
Main Thread; and
Request Threads.

Figure 4:
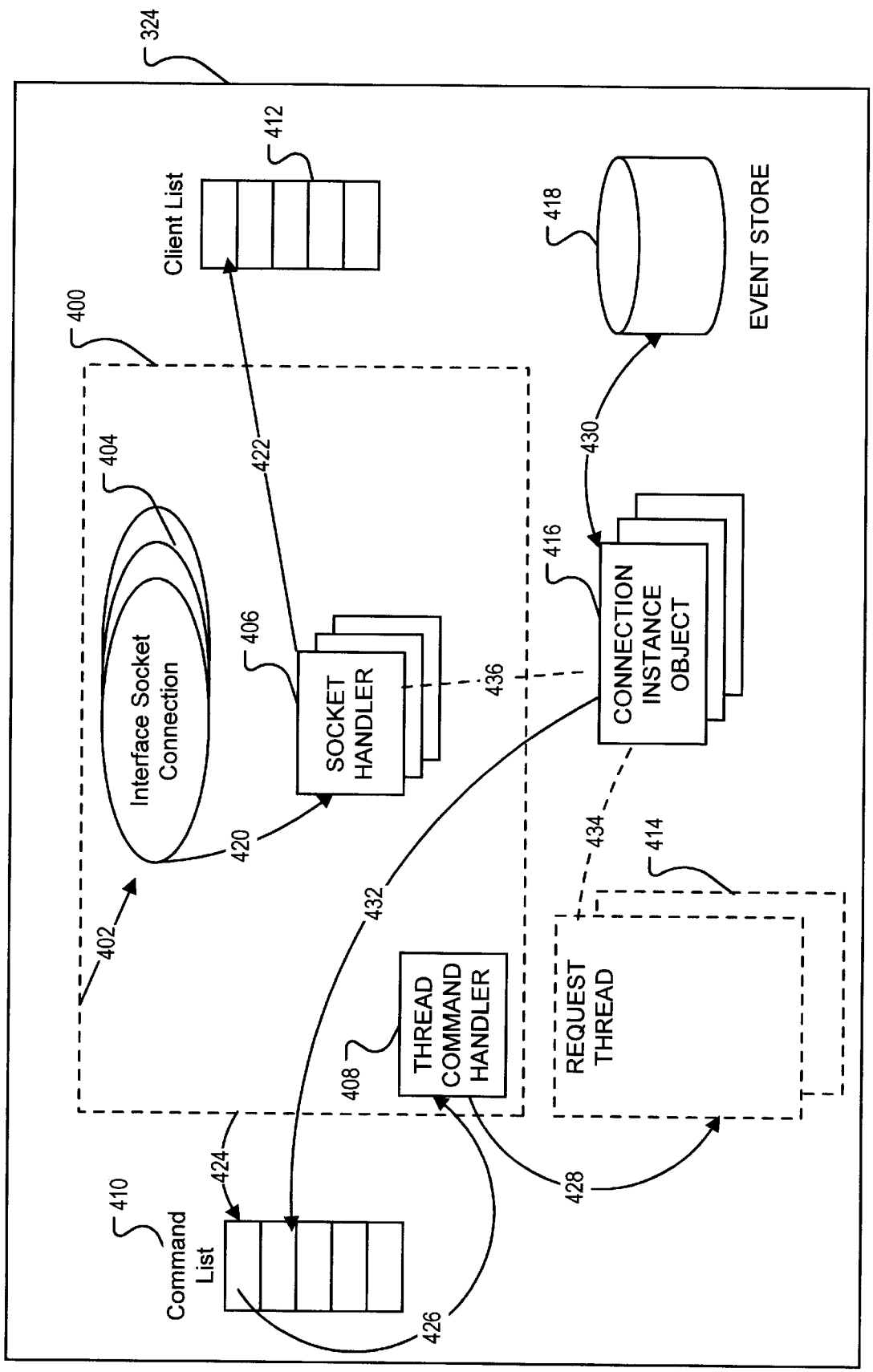
FIG. 4 illustrates an internal structure of the present invention in a preferred embodiment.

As illustrated in FIG. 4, a Processing Loop 402 detects a number of connection types on the Event Server's 324 interface socket connections 404. At system startup, the Event Server 324 is initialized to listen for communication from the following: PostMaster daemon 304, SPMD daemon 306, a first well-known port, and a second well-known port. The PostMaster daemon 304 and SPMD daemon 306 are discussed, supra. The first and second well-known ports are connections that clients can use to communicate with the Event Server 324, where the first well-known port is used exclusively for clients to initially connect to the Event Server 324, and for the Event Server 324 to return data back to clients.

The Event Server's 324 internal Event Store 418 is a master cache of updated events for the server that has several sources of event data. At initialization, as discussed above, the Event Store 418 is populated first by the Server State Store 310 to restore last-updated events, and then by the Event Data Store 308 for events added to the network system after the Server State Store 310 was last updated by the Event Store 418. During the session life of the Event Server 324, the Event Store 418 is updated with new events sent by the PostMaster daemon 304, and with updated events (i.e. deletions and modifications) originating from clients 300, 302. The Event Server 324 periodically writes the Event Store 418 to the Server State Store 310. The Event Store 418 events are maintained in a hash table where the event's UUID (provided by the PostMaster daemon, supra) is the hash lookup key into the hash table. The following table lists event information stored by the Event Store for each event:

TABLE 1

| Field | Description |
| --- | --- |
| packedUUID | the event's assigned universal unique identifier (in packed-byte format) |
| uuid | the event's assigned universal unique identifier (in a character string format) |
| category | the category (scalar) assigned to the event |
| severity | the severity value (scalar) assigned to the event |
| date | the date when the event was generated with the server (in character string format) |
| desc | the description string assigned to the event |
| source | the internet host identifier for system that generated the event |
| event_status | a state flag to indicate if the event is in an acknowledged or deleted state |
| recvdTime | numeric date representation for when the PostMaster daemon received this trap from the server |
| eventType | internal (scalar) event type identifier |
| ovObjId | the OpenView object database ID assigned to this event, if assigned (where used in OpenView) |
| timeBuf | an Event Server internal date structure that also includes a scalar order element (to differentiate events that arrived during the same second) |
| orig_packet | the complete encoded data for the event that was sent by the PostMaster daemon (used when saving events to the Server State Store) |
| orig_pack_len | the length of the orig_packet field value |
| lastMod | a structure that maintains information about clients that make modifications to saved events (audit trail) |

When a client connects to the Event Server 324 for the first time (on an interface socket connection 404 that is a first well-known port), a socket handler 406 is created 420 for that client. The socket handler 406 assigns an interface socket descriptor to the client which corresponds to an interface socket connection so that the client can have private two-way communication with the Event Server 324 (through its connection instance object 416, to be discussed). The socket handler 406 maintains this connection correspondence 436 so that whenever a client 300, 302 connects to an interface socket connection 404, the Event Server 324 knows which client has connected. The client is then added 422 to the Client List 412, which is a list of all currently connected clients.

Browsing Event Data

In addition to the socket handler, a connection instance object 416 is created when a client initially connects to the Event Server 324. A connection instance object 416 comprises attributes of a client's connection instance, or actual connection, to the Event Server 324 for the purpose of communicating with the Event Server 324 to access and manipulate event data. For instance, a connection instance object can comprise filter criteria and display attributes of the connection instance. There are two types of connection instances.

An event connection instance comprises filtered data and allows a client to access event data from the Event Store 418 according to the client's filter criteria, which may specify events with a particular severity, description, time, or owned-state, for example. Using the filter criteria of the event connection instance object 416, the Event Server retrieves matching events from the Event Store 418, and returns the matching events' UUID's back to the event connection instance object 416, where they are stored in an array of the event connection instance object. The UUID's in the array can subsequently be cross-referenced to a corresponding UUID in the Event Store's hash table for the purpose of retrieving requested event data. The array of UUID's can be updated when the client requests new filtering data (by sending new filter criteria), when new events matching then client's filter criteria are added to the Event Store, or when changes to the Event Store require that all clients synchronize with the change.

A category connection instance comprises all network event data which is organized into categories of events, and allows its client to view these categorized events. These instances ensure that clients that register as category clients have dynamic access to event categories. Rather than an array of UUID's, a category connection instance object 416 maintains a matrix of event categories, where each category comprises an event in that category having the highest severity level which is not in a user-acknowledge state.

Manipulating Event Data

Existing event data in the Event Store 418 can also be manipulated (i.e. deleted and modified). To manipulate event data, a task, (i.e. "delete an event" or "modify an event") is added 424, 432 to a Command List 410. A main thread 400 of the Event Server 324 maintains the Command List 410 by processing each task through a request thread 414. It does this by removing 426 a task from the Command List 410, and routing 428 the task to the request thread 414 that is created and maintained by a thread command handler 408 of the main thread. The request thread 414 performs the task that it was assigned to by interacting 434 with an appropriate connection instance object 416 (i.e., the client that requested the task). The connection instance object 416 interacts 430 with the Event Store 418 to retrieve and manipulate event data as specified by the requesting client. When a connection instance object 416 interacts with the Event Store 418, it executes within a request thread 414. If the Event Server 324 determines that the task affects other clients, it will broadcast this task to the other clients by placing an appropriate number of tasks on the Command List 410, creating a request thread for each task, and routing each task to a request thread. In a preferred embodiment, a client can place 432 tasks on the Command List 410 (through a corresponding connection instance object), and any logic executing within the main thread 400 of the Event Server 324 can place 424 tasks on the Command List 410.

The Command List 410 can comprise a number of command items that are used in the Event Server 324. The following table lists these events, where the Event Clients column describes what action is taken by a client corresponding to an event connection. instance object, and where the Category Clients column describes what action is taken by a client corresponding to a category connection instance object.

TABLE 2

| Command I.D. | Description | Event Clients | Category Clients |
| --- | --- | --- | --- |
| THREADCMD_UNDEFINED | Default identifier for an unknown action. | IGNORED | IGNORED |
| THREADCMD_ADD | New event(s) added to the global Event Store. | Determine if new event(s) matches current filters, and if so, add event(s) and notify client. | Determine if severity values for categories need updating, and if so, modify category and notify client. |
| THREADCMD_DEL | A client has requested that an event(s) in the current Event Store be removed. | Determine if the event(s) is currently in the filtered list, and if so, remove event(s) and notify client. | Determine if the current severity values for the categories need updating, and if so, modify category and notify client. |
| THREADCMD_ACK | A client has requested that an event(s) in the current Event Store be set to the acknowledged state. | Determine if event(s) is currently in the filtered list, and if so, modify list and notify client. | Determine if the current severity values for the categories need updating, and if so, modify category and notify client. |
| THREADCMD_UNACK | A client has requested that an event(s) in the current Event Store be set to the acknowledged state. | Determine if event(s) is currently in the filtered list, and if so, modify list and notify client. | Determine if the current severity values for the categories need updating, and if so, modify category and notify client. |
| THREADCMD_STATUS_CHANGE | An event(s) in the current Event Store has been modified by the main thread. | Ignored | Determine if the current severity values for the categories need updating, and if so, modify category and notify client. |

TABLE 2-continued

| Command I.D. | Description | Event Clients | Category Clients |
|---|---|---|---|
| THREADCMD_MESSAGE | A message string is to be sent to the client for display. | Send the string to the client. | Ignored |
| THREADCMD_EXIT | The connection instance is to terminate. | All data structures are freed and the thread of execution exits. | All data structures are freed and the thread of execution exits. |
| THREADCMD_SHUTDOWN | The entire Event Server is exiting. | All data structures are freed and the thread of execution exits. | All data structures are freed and the thread of execution exits. |
| THREADCMD_NEW_ES | The main thread has performed modifications to the current Event Store, so all event data must be re-analyzed by all clients. | Re-create filtered list from new Event Store and notify client. | Re-create category/severity matrix and notify client. |
| THREADCMD_PRINT_ALL | A client is requesting that all events in its list of events be printed to a specific printer destination. | All event field data for each event represented in the filtered list are sent to the indicated printer destination. | Ignored |
| THREADCMD_PRINT_SEL | A client is requesting that its selected events in its filtered list of events be printed to a specific printer destination. | Event field data for each event represented in the supplied selection list are sent to the indicted printer destination. | Ignored. |
| THREADCMD_SAVE_ALL | A client is requesting that all events in its list of events be saved to a specific file name. | Event field data for each event represented in the filtered list are sent to the indicated file name. | Ignored. |
| THREADCMD_SAVE_SEL | A client is requesting that its selected events in its filtered list of events be saved to a specific file name. | Event field data for each event represented in the supplied selection list are sent to the indicated file name. | Ignored. |
| THREADCMD_BEEP | The client is to create an audible beep sound. | The beep request is sent to the client. | Ignored. |
| THREADCMD_DBLOADED | The entire state of saved events (from the Server State Store and the Event Data Store) have been loaded in to the main Event Store. | The filtered list can be created and the client updated. | The category/severity matrix can be created and the client updated. |
| THREADCMD_DEL_ALL | A client has indicated that all of the events in its filtered list be deleted from the current Event Store. | All events are removed from the filtered list and the client notified. This command will only be delivered to one connection instance, so after the deletion, this |  Ignored. |

TABLE 2-continued

| Command I.D. | Description | Event Clients | Category Clients |
|---|---|---|---|
| | | instance will put command data for the THREADCMD_DEL command on the command list with the list of events that have been deleted. | |
| THREADCMD_ACK_ALL | A client has indicated that all of the events in its | All events are acknowledged in the filtered list and the client notified. This command will only be delivered to one connection instance, so after the deletion, this instance will put command data for the THREADCMD_ACK command on the command list with the list of events that have been deleted. | Ignored. |
| THREADCMD_UNACK_ALL | A client has indicated that all of the events in its filtered list be set to the unacknowledged state in the current Event Store. | All events are unacknowledged in the filtered list and the client notified. This command will only be delivered to one connection instance, so after the deletion, this instance will put command data for the THREADCMD_UNACK command on the command list with the list of events that have been deleted. | Ignored. |
| THREADCMD_BES_WAITING | Notification from the main thread that the main Event Store is still being loaded from the Event Data Store, and Server State Store, so it is unavailable for access. | Connection instance sets a state flag that it is waiting in the Event Store. | Connection instance sets a state flag that it is waiting in the Event Store. |
| THREADCMD_BES_READ | Notification from the main thread that the main Event Store ha been loaded from the Event Data Store and Server State Store, and is now available. | Connection instance unsets a state flag that it is waiting in the Event Store. | Connection instance unsets a state flag that it is waiting in the Event Store. |
| THREADCMD_EVENT_CHANGED | A client has requested that an event(s) in the | Determine if the event(s) is currently in the | Determine if the severity values for the |

TABLE 2-continued

| Command I.D. | Description | Event Clients | Category Clients |
|---|---|---|---|
| | current Event Store have its category and/or severity value(s) changed. | filtered list, and if so, modify list and notify client. | categories need updating, and if so, modify category and notify client. |
| THREADCMD_ THREADLIST_ CLEAN | Connection instance notifying main thread that it is ready to terminate its thread processing. | Ignored. | Ignored. |
| THREADCMD_ THREADLIST_ CLEAN2 | The main thread is terminating a thread of processing. | Ignored. | Ignored. |
| THREADCMD_ CHANGE_ SEVERITY | A client has requested that an event(s) in the current Event Store have its severity value changed. | Determine if the event(s) is currently in the filtered list, and if so, modify list and notify client. | Determine if the current severity values for the categories need updating, and if so, modify category and notify client. |

In TABLE 2, THREADCMD_DEL_ALL, THREADCMD_ACK_ALL, THREADCMD_UNACK_ALL, are examples of command items that are broadcast to other clients as a result of the command item, or task, affecting other clients.

While the preferred embodiment of the present invention described herein has been directed to an event server for managing event data for clients, it is to be understood that the present invention is not limited to managing event data. It is also within the scope of this invention that an event server generally be utilized as a data server for managing other types of data, including, but not limited to, database data, and traffic data of systems on a network.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for managing event data for a plurality of clients interfacing with a network, comprising:
   a. a number of computer readable media; and
   b. computer readable program code stored on said number of computer readable media, said computer readable program code for implementing an event server comprising a number of interface socket connections, said code for implementing said event server comprising:
      i. program code for creating an event store, wherein said event store comprises a number of events generated from a number of network systems in said network;
      ii. program code for establishing a connection instance between each of said number of interface socket connections and each of a number of clients desiring access to said event store, wherein each connection instance corresponds to a different one of said number of clients;
      iii. program code for creating a connection instance object for each connection instance, wherein each, connection instance object comprises attributes determined by its corresponding client, and each connection instance object provides its corresponding client with access to said event store; and
      iv. program code for manipulating said event data in said event store, comprising:
         1. program code for detecting requests to perform a number of tasks from said connection instance objects, wherein a given one of said tasks corresponds to a given one of said connection instance objects;
         2. program code for creating a command list, wherein said command list comprises said number of tasks;
         3. program code for adding a given one of said number of tasks to said command list; and
         4. program code for processing a given said task, comprising:
            A. program code for removing a given one of said number of tasks from said command list; and
            B. program code for creating a request thread, wherein a given one of said connection instance objects executes within said request thread, and said given one of said connection instance objects corresponds to said given one of said number of tasks.

2. An apparatus as in claim 1, wherein said program code for establishing said each connection instance comprises program code for establishing one of a plurality of connection instance types, said plurality of connection instance types comprising:
   a. an event connection instance comprising filtered event data, said filtered event data determined by a corresponding client's filter criteria, and said filtered event data comprising a number of said number of events in said event store; and
   b. a category connection instance comprising event data, said event data organized into categories of event data.

3. An apparatus as in claim 2, additionally comprising program code for maintaining an array of filtered event data, wherein said array comprises a universal unique identifier for each of said number of events of said filtered event data, wherein said universal unique identifier corresponds to a given one of said number of events of said event store.

4. An apparatus as in claim 3, wherein said program code for creating an event store comprises program code for creating a hash table, wherein said hash table comprises said number of events of said event store, and each of said number of events of said event store corresponds to one of said universal unique identifiers.

5. An apparatus as in claim 1, additionally comprising program code for creating a number of additional request threads, wherein said number corresponds to a number of clients affected by said given one of said number of tasks from said command list.

6. An apparatus as in claim 1, wherein said program code for detecting requests to perform a number of tasks comprises program code for detecting a request to delete a number of said number of events.

7. An apparatus as in claim 1, wherein said program code for detecting requests to perform a number of tasks comprises program code for modifying a severity value of a number of said number of events.

8. An apparatus as in claim 1, wherein said program code for detecting requests to perform a number of tasks comprises program code for modifying a state value of a number of said number of events.

9. An apparatus as in claim 1, wherein said program code for implementing an event server comprises program code for implementing an event server that executes in a main thread, and said program code for detecting requests to perform a number of tasks comprises detecting requests from said main thread.

10. An apparatus as in claim 1, wherein said program code for detecting requests to perform a number of tasks comprises detecting requests from said number of clients.

11. An apparatus as in claim 1, additionally comprising program code for creating a thread command handler, wherein said thread command handler maintains a list of said request threads, and wherein each of said request threads is created in response to detecting said requests to perform said number of tasks.

12. An apparatus as in claim 1, additionally comprising program code for creating a socket handler for a given said connection instance, wherein said socket handler assigns an interface socket descriptor to a client corresponding to said given connection instance, and a given said interface socket descriptor reference a given one of said number of interface socket connections for said corresponding client to communicate with said event server.

13. An apparatus as in claim 1, additionally comprising program code for maintaining a client list, wherein said client list maintains a list of said number of clients corresponding to said number of connection instances.

14. An apparatus for managing event data for a plurality of clients interfacing with a network, comprising:
  a. a number of computer readable media; and
  b. computer readable program code stored on said number of computer readable media, said computer readable program code for implementing an event server comprising a number of interface socket connections, said code for implementing said event server comprising:
    i. program code for creating an event store, wherein said event store comprises a number of events generated from a number of network systems in said network;
    ii. program code for establishing a connection instance between each of said number of interface socket connections and each of a number of clients desiring access to said event store, wherein each connection instance corresponds to a different one of said number of clients;
    iii. program code for creating a connection instance object for each connection instance, wherein each connection instance object comprises attributes determined by its corresponding client, and each connection instance object provides its corresponding client with access to said event store;
    iv. program code for maintaining said event store, comprising:
      1. program code for initializing said event store with event data, comprising:
        A. program code for populating said event store from a server state store, wherein said server state store comprises last-saved event data of said event server; and
        B. program code for populating said event store from an event data store, wherein said event data store comprises all event data related to said number of network systems in said network;
      2. program code for receiving a number of new events from a postmaster daemon, wherein said postmaster daemon collects said number of new events from said network, and forwards said events to said event store of said event server; and
      3. program code for changing said event data of said event store, wherein requests for said changing originate from clients corresponding to said number of connection instances.

15. An apparatus as in claim 14, additionally comprising program code for maintaining said server state store, wherein said server state store is periodically populated by said event store.

16. An apparatus for managing event data for a plurality of clients interfacing with a network, comprising:
  a. a number of computer readable media; and
  b. computer readable program code stored on said number of computer readable media, said computer readable program code for implementing an event server comprising a number of interface socket connections, said code for implementing said event server comprising:
    i. program code for creating and accessing an event store, wherein said event store comprises a number of events generated from a number of network systems in said network;
    ii. program code for establishing a connection instance between each of said number of interface socket connections and each of a number of clients desiring access to said event store, wherein each connection instance corresponds to a different one of said number of clients;
    iii. program code for creating a connection instance object for each connection instance, wherein each connection instance object comprises attributes determined by its corresponding client, and each connection instance object provides its corresponding client with access to said event store;
    iv. program code for detecting requests to perform a number of tasks from said connection instance objects, wherein a given one of said tasks corresponds to a given one of said connection instance objects;
    v. program code for creating a command list, wherein said command list comprises said number of tasks;
    vi. program code for adding a given one of said number of tasks to said command list; and vii. program code for processing a given said task, comprising:
   (1) program code for removing a given one of said number of tasks from said command list; and
   (2) program code for creating a request thread, wherein a given one of said connection instance objects executes within said request thread, and said given one of said connection instance objects corresponds to said given one of said number of tasks.

17. An apparatus as in claim 16, wherein said program code for establishing said each connection instance comprises program code for establishing one of a plurality of connection instance types, said plurality of connection instance types comprising:
   a. an event connection instance comprising filtered event data, said filtered event data determined by a corresponding client's filter criteria, and said filtered event data comprising a number of said number of events in said event store; and
   b. a category connection instance comprising event data, said event data organized into categories of event data.

18. An apparatus as in claim 17, additionally comprising program code for maintaining an array of filtered event data, wherein said array comprises a universal unique identifier for each of said number of events of said filtered event data, wherein said universal unique identifier corresponds to a given one of said number of events of said event store.

19. An apparatus as in claim 18, wherein said program code for creating an event store comprises program code for creating a hash table, wherein said hash table comprises said number of events of said event store, and each of said number of events of said event store corresponds to one of said universal unique identifiers.

20. An apparatus as in claim 16, additionally comprising program code for maintaining said event store, comprising:
   a. program code for initializing said event store with event data, comprising:
      i. program code for populating said event store from a server state store, wherein said server state store comprises last-saved event data of said event server; and
      ii. program code for populating said event store from an event data store, wherein said event data store comprises all event data related to said number of network systems in said network;
   b. program code for receiving a number of new events from a postmaster daemon, wherein said postmaster daemon collects said number of new events from said network, and forwards said events to said event store of said event server; and
   c. program code for changing said event data of said event store, wherein requests for said changing originate from clients corresponding to said number of connection instances.

21. A method for managing data for a plurality of clients interfacing with a network by implementing a data server comprising a number of interface socket connections, comprising:
   a. creating a data store, wherein said data store comprises a number of data items generated from a number of network systems in said network;
   b. establishing a connection instance between each of said number of interface socket connections and each of a number of clients desiring access to said data store, wherein each connection instance corresponds to a different one of said number of clients;
   c. creating a connection instance object for each connection instance, wherein each connection instance object comprises attributes determined by its corresponding client, and each connection instance object provides its corresponding client with access to said data store;
   d. detecting requests to perform a number of tasks from said connection instance objects, wherein a given one of said tasks corresponds to a given one of said connection instance objects;
   e. creating a command list, wherein said command list comprises said number of tasks;
   f. adding a given one of said number of tasks to said command list; and
   g. processing a given said task, comprising:
      i. removing a given one of said number of tasks from said command list; and
      ii. creating a request thread, wherein a given one of said connection instance objects executes within said request thread, and said given one of said connection instance objects corresponds to said given one of said number of tasks.

22. A method as in claim 21, wherein said creating a data store comprises creating an event store comprising event data, wherein said event data comprises a number of event generated from a number of network systems in said network.

23. A method as in claim 22, wherein said establishing a connection instance comprises establishing one of a plurality of connection instance types, said plurality of connection instance types comprising:
   a. an event connection instance comprising filtered event data, said filtered event data determined by a corresponding client's filter criteria, and said filtered event data comprising a number of said number of events in said event store; and
   b. a category connection instance comprising event data, said event data organized into categories of event data.

24. A method as in claim 23, additionally comprising maintaining an array of filtered event data, wherein said array comprises a universal unique identifier for each of said number of events of said filtered event data, wherein said universal unique identifier corresponds to a given one of said number of events of said event store.

25. A method as in claim 24, wherein said creating an event store comprises creating a hash table, wherein said hash table comprises said number of events of said event store, and each of said number of events of said event store corresponds to one of said universal unique identifiers.

* * * * *